US012607471B2

(12) United States Patent
Puramana et al.

(10) Patent No.: US 12,607,471 B2
(45) Date of Patent: Apr. 21, 2026

(54) INTEGRATING AIR QUALITY INTO URBAN NAVIGATION

(71) Applicant: DISH Network Technologies India Private Limited, Bangalore (IN)

(72) Inventors: Dileep Puramana, Wandoor (IN); Manasa Jami, Madhurawada (IN); Vikram Balarajashetty, Bangalore (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 152 days.

(21) Appl. No.: 18/210,168

(22) Filed: Jun. 15, 2023

(65) Prior Publication Data

US 2024/0418520 A1 Dec. 19, 2024

(51) Int. Cl.
*G01C 21/34* (2006.01)
*G01C 21/36* (2006.01)

(52) U.S. Cl.
CPC ..... *G01C 21/3461* (2013.01); *G01C 21/3694* (2013.01)

(58) Field of Classification Search
CPC .......................... G01C 21/3461; G01C 21/3694
See application file for complete search history.

(56) References Cited

U.S. PATENT DOCUMENTS

| | | | |
|---|---|---|---|
| 8,909,474 B2 | 12/2014 | McSchooler | |
| 11,164,269 B1 * | 11/2021 | Locke ................... | H04W 4/024 |
| 11,984,029 B2 * | 5/2024 | Lei ......................... | G01C 21/30 |
| 2010/0057340 A1 | 3/2010 | Kravets et al. | |
| 2012/0191338 A1 | 7/2012 | French et al. | |
| 2013/0013198 A1 * | 1/2013 | Adrain ............... | G01C 21/3461 |
| | | | 701/540 |
| 2013/0080053 A1 * | 3/2013 | Rakshit .............. | G01C 21/3469 |
| | | | 701/527 |
| 2017/0091350 A1 * | 3/2017 | Bauer ..................... | G06F 30/15 |
| 2017/0199045 A1 * | 7/2017 | George .............. | G01C 21/3469 |
| 2018/0188050 A1 * | 7/2018 | Duan ................... | G08G 1/0141 |

(Continued)

FOREIGN PATENT DOCUMENTS

WO 2017072807 A1 5/2017

*Primary Examiner* — Abdalla A Khaled
(74) *Attorney, Agent, or Firm* — Wash Park IP Ltd.; John T. Kennedy

(57) ABSTRACT

Processes, devices, and systems for routing a user from a current location to a destination are described. A process may include determining, by a user device, a current user location ("CUL"); obtaining a current user location air quality environment ("CULAQE"); obtaining a current user location air quality index ("CULAQI"); determining a destination location ("DL"); determining a current route segment ("CRS") from the CUL to the DL; and optimizing the CRS based on the CULAQI. A mapping application may identify the CULAQE and the CULAQI may be determined from an air quality rating. Operations may include receiving real-time air quality index data ("RAQI") for the CULAQE, optimizing the CRS based on the RAQI, obtaining a destination location first air quality environment ("DLAQE(1)"), obtaining a destination location first air quality index ("DLAQI(1)"), receiving RAQI for the DLAQE(1), and optimizing a user's routing based on the RAQI for the DLAQE(1).

18 Claims, 7 Drawing Sheets

(56)                References Cited

U.S. PATENT DOCUMENTS

| | | | |
|---|---|---|---|
| 2019/0033278 A1* | 1/2019 | Mou | G01W 1/02 |
| 2020/0225051 A1* | 7/2020 | Dhullipala Chenchu | G01C 21/3461 |
| 2020/0300650 A1* | 9/2020 | Li | G06Q 10/02 |
| 2020/0355508 A1* | 11/2020 | Bruns | G07C 5/008 |
| 2021/0116254 A1* | 4/2021 | Fox | G01C 21/3691 |
| 2021/0129633 A1* | 5/2021 | Dingli | B60H 3/0007 |
| 2021/0172753 A1* | 6/2021 | Johnson, Jr. | G01C 21/343 |
| 2021/0372650 A1* | 12/2021 | Hyde | F24F 11/39 |
| 2022/0164911 A1* | 5/2022 | Stumpf | H04W 4/024 |
| 2022/0187085 A1* | 6/2022 | Luciani | G01C 21/3484 |
| 2023/0241942 A1* | 8/2023 | Hornstein | B60H 1/008 454/165 |

* cited by examiner

INTEGRATING AIR QUALITY INTO URBAN NAVIGATION

TECHNICAL FIELD

The technology described herein generally relates to devices, systems, and processes for providing persons commuting through a given geographical area from a current location, such as a starting location, or an intermediate location to one or more intermediate destinations and/or a final destination with access to environmental information, such as air quality information, and providing routing information therebetween based on the environmental information.

BACKGROUND

Today, those traveling between various locations in a city, region, or otherwise encounter varying levels of air quality. In some areas, the air quality may be harmful and/or hazardous to certain people. While applications such as GOOGLE MAPS and others provide air quality overlay maps, people traveling are often uninformed and/or unprepared when air quality conditions in a given area in which they are located and/or into which they will be traveling into and/or through are harmful, may improve or worsen over a given period, or otherwise positively or negatively change. Accordingly, a need exists to provide people traveling (herein, each such person a "user") between two or more locations with real-time locational and situational information regarding air quality in areas in which they are currently located, at a given time, into and/or through which they may travel, and at one or more given destinations.

SUMMARY

The various implementations of the present disclosure relate in general to devices, systems, and processes for facilitating navigation in view of air quality at one or more locations between a current location, one or more intermediate locations, and at one or more given destinations for a user.

In accordance with at least one implementation of the present disclosure, a process, for routing a user from a current location to at least one destination, may include determining, by a user device, a current user location ("CUL") of a user; obtaining, for the CUL, a current user location air quality environment ("CULAQE"); obtaining, for the CULAQE, a current user location air quality index ("CULAQI"); determining a destination location ("DL") for a destination; determining a current route segment ("CRS") from the CUL to the DL; and first optimizing the CRS based on the CULAQI. The CULAQE may be identified by mapping application; and the CULAQI for the CULAQE may be determined from an air quality rating provided by a governmental entity.

For at least one implementation, the process may include receiving real-time air quality index data ("RAQI") for the CULAQE; and second optimizing the CRS based on the RAQI for the CULAQE. For at least one implementation, the process may include: obtaining, for the DL, a destination location first air quality environment ("DLAQE(1)"); and obtaining, for the DLAQE(1), a destination location first air quality index ("DLAQI(1)"). For at least one implementation, the process may include: receiving RAQI for the DLAQE(1); and the first optimizing may be based on the RAQI for the DLAQE(1). The first optimizing may be also based on the DLAQI(1).

For at least one implementation, the process may include second optimizing the CRS based on the DLAQI(1). For at least one implementation, the process may include: obtaining, for the DL, a destination location second air quality environment ("DLAQE(2)"); and obtaining, for the DLAQE (2), a destination location second air quality index ("DLAQI (2)"). For at least one implementation, the process may include: rank ordering the DLAQI(1) and the DLAQI(2); and the first optimizing may be based on a higher ranked of the DLAQI(1) and the DLAQI(2).

For at least one implementation, the process may include: identifying at least one transient air quality environment ("TAQE"); and obtaining, for the TAQE, a transient air quality index ("TAQI"). For at least one implementation, the process may include second optimizing the CRS based on the TAQI. For at least one implementation, the process may include receiving real-time air quality index data ("RAQI") for the TAQE and the second optimizing of the CRS may be based on the RAQI for the TAQE.

For at least one implementation of the present disclosure, a computer readable medium, non-transiently stores first computer instructions which, when executed by at least one processor instantiates an enviro-engine which configures a user device to route a user from a current location to a destination by performing routing operations comprising: determining, by the user device, a current user location ("CUL") of a user; obtaining, for the CUL, a current user location air quality environment ("CULAQE"); obtaining, for the CULAQE, a current user location air quality index ("CULAQI"); determining a destination location ("DL") for a destination; determining a current route segment ("CRS") from the CUL to the DL; and first optimizing the CRS based on the CULAQI. For at least one implementation of the computer readable medium, the CULAQE may be obtained from a mapping application. For at least one implementation of the computer readable medium, the CULAQI may be determined based on air quality data readings received from at least one Internet-of-Things ("IoT") sensors located within the CULAQE.

For at least one implementation of the computer readable medium, the routing operations may include: obtaining, for the DL, a destination location air quality environment ("DLAQE"); obtaining, for the DLAQE, a destination location air quality index ("DLAQI"); receiving RAQI for the DLAQE; and second optimizing the CRS based on the RAQI for the DLAQE. The routing operations may include receiving real-time air quality index data ("RAQI") for the CULAQE, and the second optimizing may be based on the RAQI for the CULAQE. For at least one implementation of the computer readable medium, the routing operations may include: identifying at least one transient air quality environment ("TAQE"); obtaining, for the TAQE, a transient air quality index ("TAQI"); and third optimizing the CRS based on the TAQI. For at least one implementation of the computer readable medium, the routing operations may include executing second computer instructions which instantiate a vehicle configuration engine which configures the user device to provide controlled air space within a vehicle during transit along at least a portion of the CRS.

For at least one implementation of the present disclosure, a user device may include a processor; a data store storing non-transient computer instructions; and a network interface; wherein the processor, when executing the computer instructions instantiates an enviro-engine which configures the user device to route a user from a current location to a destination by performing one or more routing operations including: determining, by the user device, a current user location ("CUL") of a user; obtaining, for the CUL, a current user location air quality environment ("CULAQE"); obtaining, for the CULAQE, a current user location air quality index ("CULAQI"); determining a destination location ("DL") for a destination; determining a current route segment ("CRS") from the CUL to the DL; first optimizing the CRS based on the CULAQI; obtaining, for the DL, a destination location air quality environment ("DLAQE"); obtaining, for the DLAQE, a destination location air quality index ("DLAQI"); receiving RAQI for the DLAQE; second optimizing the CRS based on the RAQI for the DLAQE; identifying at least one transient air quality environment ("TAQE"); obtaining, for the TAQE, a transient air quality index ("TAQI"); third optimizing the CRS based on the TAQI; receiving real-time air quality index data ("RAQI") for at least one of the CULAQE, the DLAQE, and the TAQE; and fourth optimizing the CRS based on the RAQI.

BRIEF DESCRIPTION OF THE DRAWINGS

The features, aspects, advantages, functions, modules, and components of the devices, systems and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a–108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

4 or more route segments therebetween, and in accordance with at least one implementation of the present disclosure.

DETAILED DESCRIPTION

The various implementations described herein are directed to devices, systems, and processes for facilitating navigation by one or more users in view of air quality in one or more areas. In accordance with at least one implementation, relevant, real-time information regarding air quality conditions at one or more locations along one or more route segments between a first or current location, one or more intermediate locations, and one or more given destinations is utilized to facilitate user navigation from a current location to the one or more given destinations.

Figure 1:
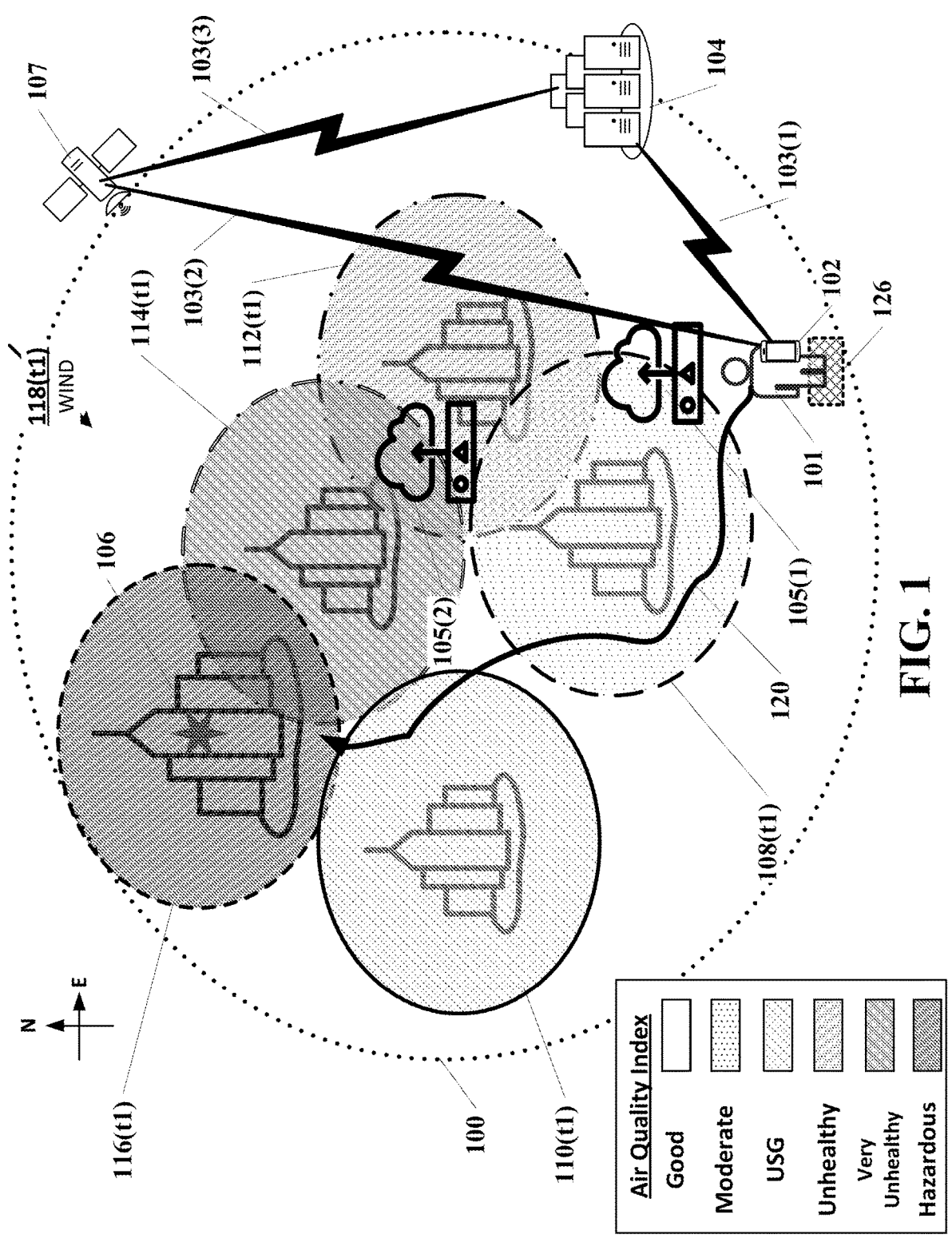
FIG. 1 is a schematic representation of an urban environment in which a system for facilitating navigation in view of air quality may be utilized by a user at a first location and in accordance with at least one implementation of the present disclosure.

As shown in FIG. 1, an urban environment 100 in which a system for facilitating navigation in view of air quality may be utilized may be delineated into one or more air quality environments ("AQEs"), such as a first AQE 108, a second AQE 110, a third AQE 112, a fourth AQE 114, and a fifth AQE 116. An AQE may refer to any geographic area, such as a country, state, county, metropolitan area, city, district, street, building, or the like. The area for which a given AQE may be provided generally corresponds to a fixed and/or variably defined geographic area, such as an area designated using a mapping application, with non-limiting examples of mapping applications including Google MAPS, Apple MAPs and the like as provided by Google Inc., Apple Inc., Garmin Inc., and others. As illustrated in FIG. 1, an AQE may exist at a given time, such as at a first time (t1), which is illustrated by a circular region for a first AQE-t1 108(t1). In FIG. 1, an AQE is shown using circles and ellipses. An AQE may take any geometric form. For an implementation, an AQE may include one or more contiguous or non-contiguous geographic areas. A geographic area identified as being with a given AQE may change over time.

Figure 2:
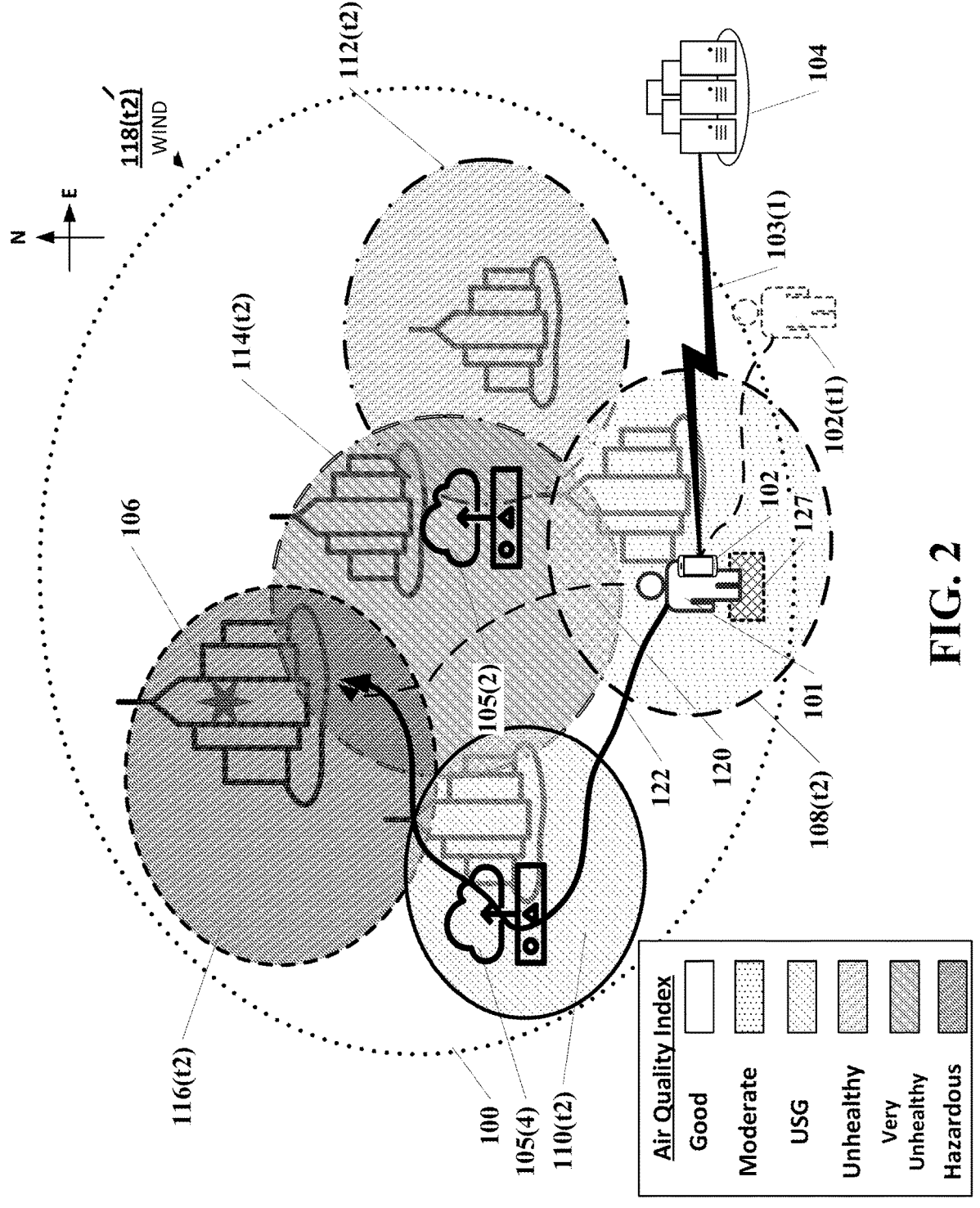
FIG. 2 is a schematic representation of an urban environment in which a system for facilitating navigation in view of air quality may be utilized by the user at a second location and in accordance with at least one implementation of the present disclosure.

For example, in FIG. 1 at time t1, the fourth AQE 114(t1) is associated with a smaller geographic area than exists at a second time (t2), as shown in FIG. 2, by the fourth AQE-t2 114(t2). Expansion, contraction, appearance, disappearance, relocation, or other changes in a given AQE (herein, an "AQE change") may occur for any reason, such as in view of a prevailing wind 118 direction, based on time of day (e.g., ozone levels increasing throughout a day and decreasing at night), commuters (e.g., emitting pollution), environmental accidents, or otherwise. An AQE change may occur predictively (e.g., based upon statistical analysis based on past determined changes in an AQE), randomly (e.g., based upon sudden changes in wind directions, commuter intensity changes), or otherwise.

A data center 104 may use real-time measurements, past measurements, and other data (e.g., traffic data) to determine a current configuration for a given AQE and to predict future configurations of a given AQE. Artificial intelligence and/or machine learning technologies may ("AI/ML") be used to analyze AQE changes, traffic patterns, weather patterns, calendar data (e.g., when major events are scheduled to occur within a given geographic area) and other data across multiple geographic areas to predict and identify current and future AQEs for one or more geographic areas more accurately. The data center 104 separately and/or in conjunction with a user device 102, or the user device 102 independently itself, may tailor one or more AQEs to a given user 101 based upon user profile information regarding such user, such as health conditions, allergies, commuting needs, scheduled events, past patterns of activities (e.g., the user commonly goes out for lunch on Fridays but not on Tuesdays), or the like. The user profile information being suitably stored in a data store accessible to one or both the data center 104 and the user device 102.

For at least one implementation, an AQE may be expressed in terms of one or more quantifiable conditions, such as past, present and/or future chemical composition of the air, weather conditions in the geographic areas, combinations thereof, or other factors affecting or predictable to affect an AQE for a given geographic area.

For at least one implementation, an AQE may be expressed in terms of an Air Quality Index ("AQI"). For at least one implementation, an AQI may be determined based on air quality ratings provided by a governmental entity such as the United States' National Weather Service ("NWS"). For a non-limiting example, the AQI may be based on the AirNow™ ratings used by the NWS; AIRNOW ratings include good, moderate, Unhealthy for Sensitive Groups ("USG"), unhealthy, very unhealthy, and hazardous. An AQI may correspond to an AIRNOW rating. Other air quality ratings may be used for other implementations. An AQI may be generated based upon any factor or combinations thereof including, for a non-limiting example, the five major pollutants regulated by the United States' Clean Air Act—namely, ground-level ozone, particle/particulate pollution, carbon monoxide, sulfur dioxide, and nitrogen dioxide. An AQI may include ratings based on one or more pollutants and/or other classifications.

As shown in FIG. 1, an urban environment 100 may be generally associated with a given AQI, such as the "good" classification (as shown in FIG. 1 by areas not otherwise overlapped by another AQE). An urban environment 100 may be commonly associated with any given baseline AQI classification. For example, New Delhi, India may be commonly associated with a baseline AQI classification of "Moderate" whereas Bangaluru, India may be commonly associated with a baseline AQI classification of "Good." As used herein, a baseline classification may be determined based upon measurements for a given urban environment 100 over a past period, which for at least one implementation includes daily measurements of a given geographic area over two or more years. A baseline AQI classification may change over time. Air pollution within a given urban environment 100 may change over time based on impacts of pollution control measures, urban density, changes in the number of air polluting vehicles present within the urban environment, or the like.

For at least one implementation, systems may present navigation solutions to users based on AQIs for one or more AQEs within an urban environment 100 and based on a comparison of current AQI for a given AQE versus a baseline AQE for the given urban environment 100. For example, when the given urban environment 100 has a baseline AQI of "moderate" and the one or more AQEs between a current location and a given destination 106 also each have a "moderate" rating, navigation solutions may not be generated—the user may be instructed that any route chosen the current location and the given destination 106 is acceptable at that time.

As shown in FIG. 1 and at the first time t1, the first AQE-t1 108(*t*1) has a "moderate" AQI, the second AQE-t1 110(*t*1) has a "USG" AQI, the third AQE-t1 112(*t*1) has an "unhealthy" AQI, the fourth AQE-t1 114(*t*1) has a "very unhealthy" AQI, and the fifth AQE-t1 116(*t*1) has a "hazardous" AQI.

As shown in FIG. 2 and at the second time t2 (*t*2 occurring after t1), the first AQE-t2 108(*t*2) has shifted southwards (as represented by the coordinate system shown on the figure), the second AQE-t2 110(*t*2) has been impinged by an expansion of the third AQE-t2 110(*t*2), the third AQE-t2 112(*t*2) has expanded into geographic areas previously predominately covered by the fourth AQE 114, the fourth AQE-t2 114(*t*2) has shifted towards the southwest and expanded in size, and the fifth AQE 116-*t*2 116(*t*2) has shifted southwards.

Figure 3:
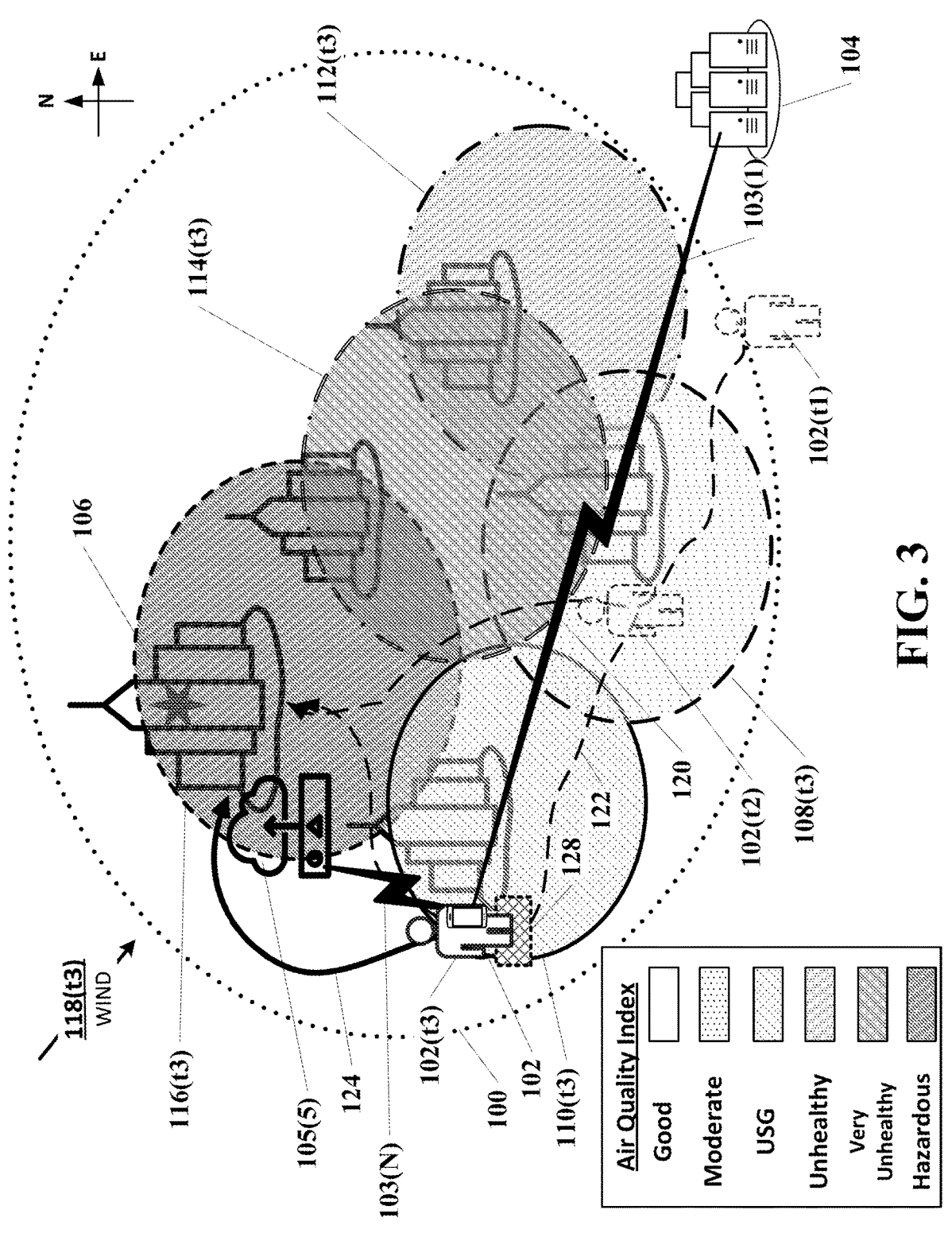
FIG. 3 is a schematic representation of an urban environment in which a system for facilitating navigation in view of air quality may be utilized by a user at a third location and in accordance with at least one implementation of the present disclosure.

As shown in FIG. 3 and at a third time (t3) (t3 occurring after t2), the AQI for the first AQE-t3 108(*t*3) has further degraded based on the current location of the fourth AQE-t3 114(*t*3), and the current location of the fifth AQE-t3 116(*t*3).

As shown in FIG. 1, a user 101 may have access to a user device 102 (as further described herein). The user device 102 may be any device configured to determine and/or receive one or more AQEs based on one or more AQIs that are independently and/or cooperatively determined by the user device 102, a data center 104, one or more second user devices, third party data, such as that provided by the United States Environmental Protection Agency and other organization. AQIs for one or more geographic areas may be determined and/or received by a given user device 102 so that one or more AQEs may be generated and provide real-time navigation and "air quality instructions" to a user 101 of the given user device 102.

For at least one implementation, real-time navigation instructions provided to a given user 101, and/or one or more second users, may be based on the AQIs for one or more AQEs corresponding to one or more of a current location for the given user (and/or one or more second users), such as a first user current location 126, a destination 106 and one or more intermediate locations therebetween. As shown in FIG. 1, the first user current location 126 is illustrated as an area within the urban environment 100, at a given time. For at least one implementation, the user's current location may correspond to a stationary position (e.g., a location that does not change over a given time period, such as over an eight hour work-day), a mode of transit (e.g., "on-foot", as an occupant of a vehicle, as a passenger on a train, as a bicyclist, or another use form of locomotion and/or transportation), a combination of the foregoing, or otherwise. As shown in FIG. 2, a user's current location may be, at the second time t2, a second user current location 127. As shown in FIG. 3, a user's current location may be, at the third time t3, a third user current location 128.

For at least one implementation, the user device 102 may be coupled with a mode of transportation, integrated into a mode of transportation, be a stand-alone device, or otherwise provided. For example, a user device 102 may be coupled to an infotainment system within an automobile during all or a portion of a user's movement from a current location to a second location and/or to a destination.

For at least one implementation, the user device 102 may be communicatively coupled to a data center 104 by a first coupling 103(1), and/or to a satellite system 107 by a second coupling 103(2). The satellite system 107 may be coupled to the data center 104 by a third coupling 103(3).

The data center 104 and/or satellite system 107 may be configured to generate and/or provide data regarding AQI data for one or more AQEs and/or other information useful in providing navigation, for the user 101, from a given user current location 126 to a given destination 106. The AQI data may be provided based on past conditions, current conditions and/or expected future conditions in one or more AQEs including AQEs arising along a given route between a current user location and a destination. The AQI data may be provided at any time, and/or at any given intervals. The AQI data may be pushed to the user device 102, pulled by the user device 102, generated in whole or in part by the user device 102 or otherwise determined.

Based on then available AQI data for one or more AQEs situated between a user's current location, such as the first user current location 126, and a destination, such as the given destination 106, the user device 102 may determine and provide navigation instructions to the user 101.

For example, navigation instructions may include a first routing 120 for the user 101 at the first time t1. As shown in FIG. 1, the first routing 120 may provide navigation instructions which route a user through the first AQE 108, along a portion of the second AQE 110, while avoiding the third AQE 112 and the fourth AQE 114, and through as little of the fifth AQE 116, until the given destination 106 is reached.

At the second time t2, as shown in FIG. 2, the user's location may have changed, such as to the second user current location 127. Prior to and/or at this second time t2, for example, the user device 102 (alone and/or in cooperation with the data center 104 and/or other user devices 102) may have determined that given the change in configuration of the fourth AQE-t2 114(t2), the user 101 should proceed along a second routing 122 to the destination. As shown, for this illustrative example, the second routing 122 directs the user 101 to proceed into the second AQE-t2 110(t2) and bypass the geographic area(s) encompassed by the fourth AQE-t2 114(t2)—thereby reducing exposure by the user 101 to the "very unhealthy" determined to exist, or likely exist, in the fourth AQE-t2 114(t2).

At the third time t3, as shown in FIG. 3, the user's location may have changed, such as to the third user current location 128. Prior to and/or at this third time t3, for example, the user device 102 (alone and/or in cooperation with the data center 104 and/or other user devices 102) may have determined that given the change in configurations of the fourth AQE-t3 114(t3) and/or the fifth AQE-t3 116(t3), the user 101 should proceed along a third routing 124 to the destination 106. As shown, for this illustrative example, the third routing 124 directs the user 101 to proceed to the west of the fifth AQE-t3 116(t3) so as to approach the destination 106 from a Northwest direction and thereby reduce exposure to the air in the fifth AQE-t3 116(t3).

For at least one implementation and as shown in FIG. 1, one or more air quality sensors may, at a given time, be associated with one or more AQEs. For at least one implementation an air quality sensor may be configured as an Internet-of-Things ("IoT") air quality sensor that outputs generates and outputs air quality data readings. Herein, IoT and non-IoT air quality sensors are individually and collectively identified as each being an "IoT sensor 105." An IoT sensor 105, at any given time, may be at a fixed location or mobile. For example, an IoT sensor 105 may be provided in or with a vehicle, which while stationary determines a first stationary AQI for a given AQE and while mobile determines a second mobile AQI for one or more AQEs. Any number of IoT sensors 105 may be used in a given implementation of the present disclosure in a given urban environment 100.

For at least one implementation, an IoT sensor 105 may be communicatively coupled to the user device 102 and/or the data center 104. A given IoT sensor 105 may be configured to communicatively couple with the user device 102 directly, such as when the user device 102 and the given IoT sensor 105 are within wireless communications range, and/or indirectly, such as via the data center 104 or other intermediary system.

For a non-limiting example, a first IoT sensor 105(1) may be located within the then occurring first AQE 108(t1) and within wireless range of the user device 102, when the user device 102 is located at the first user current location 126. When the user device 102 is located at the second user current location 127, as shown in FIG. 2, the first IoT sensor 105(1) and the user device 102 may no longer be within wireless range, but a second IoT sensor 105(2) may be within wireless communications range of the user device 102. As shown in FIG. 2, the second IoT sensor 105(2) may be located in an area that overlaps with a then occurring, at the second time t2, third AQE 112(t2) and the fourth AQE 114(t2). As shown in FIG. 3, a fifth IoT sensor 105(5) may be located, at the third time t3, within the fifth AQE 116.

An IoT sensor 105 may be configured to detect air quality conditions for one or more AQEs using any form of air quality measurement technologies and processes. For an implementation, an IoT sensor 105 may include a laser-based sensor which is configured to detect dust particulates in the air. For an implementation, an IoT sensor 105 may include a gas sensor (e.g., configured to detect carbon monoxide, carbon dioxide, nitrogen dioxide, sulfur dioxide and/or other air contaminants).

One or more of the various implementations described herein may utilize combinations of IoT devices or similar devices, mobile computing technologies, such as those provided by smartphones, tablets and the like, network based to data sources such as those provided by cloud and/or mobile based computing resources, augmented reality technologies, satellite technologies, and other technologies to inform users real-time about an AQI of a given AQE.

As used herein, "real-time" generally relates to a period during which a user 101 will be exposed to air within a given AQE, such period being identified herein as an AQE Exposure Period (AQEEP). An AQEEP may occur during an activity within an AQE such as while commuting to/from work, while on a lunch break outdoors, while engaging in a sporting activity, or otherwise. As used herein, "real-time" excludes periods that occur prior to and after an AQEEP.

For at least one implementation, an AQEEP may begin when a user 101 proceeds from a controlled air space ("CAS") into an AQE. As used herein, a CAS provide an "internal air environment" ("IAE") which meets or exceeds a given minimum Indoor Air Quality ("IAQ") level. The AQI may be unique to a given user, common to two or more users, specific to a given type of user, or otherwise specified. An AQI may vary over time and in view of a user's or group of user's IAE needs. For example, when influenza is prevalent in a given area, the AQI may be more stringent than during other periods. Similarly, a user who has asthma may be associated with an AQI level that is specific to that user.

An AQEEP may end or be suspended when the user 101 returns from an AQE into a CAS. For example, an AQEEP may begin when a user 101 exits a CAS and proceeds into and/or through an AQE to a vehicle. The AQEEP may be suspended during transit while the user 101 is in the vehicle and the vehicle is a CAS—i.e., the IAE for the vehicle meets or exceeds a given IAQ.

For at least one implementation, the user device 102 may be configured to instruct a vehicle, building, or the like to be a CAS by closing windows, activating air filtering, or the like. For another implementation, a user may manually configure the vehicle, building, or the like as a CAS by using window controls, air conditioning controls, air filtering controls, or the like. An AQEEP may be continued when the user exits the vehicle into an AQE. The AQEEP may end when the user enters another CAS, which may be the same or a different CAS from which the user initially departed.

It is to be appreciated that AQI data for one or more AQEs available prior to initiation of an AQEEP may be informative to a user 101 in assessing whether to proceed from a given CAS into an AQE. For at least one implementation, "real-time AQI data (RAQD)" may include AQI data captured within five (5) minutes or less prior to an AQEEP. RAQD, for example, may include weather data, such as wind direction and speed, transit data such as the speed of vehicles on given roads, delays, or other incidents that may extend the duration of an AQEEP, and other data. RAQD may exist for any period, such as temporally, before an AQEEP is initiated, permanently, until an AQEEP ends, or otherwise. RAQD may be generated on any periodicity, such as on a daily, scheduled, user initiated, ad hoc, calendared, or other basis. Accordingly, as used herein, RAQD may include IAQ, AQI, and other data arising and prior to, during, and/or after an AQEEP.

For at least one implementation, post-AQEEP AQI data may be indicative of AQI data actually arising during an AQEEP. Such post-AQEEP AQI data may be used to inform a user 101 of remediation actions to take, if any, in view of their exposure to RAQD during an AQEEP. For example, a user 101 who suffers from asthma may be instructed, by a user device 102, to use a rescue inhaler after an exposure to air exceeding a minimum AQI level. The minimum AQI level may be user specific, common to two or more users, temporarily provided, seasonally provided (e.g., an AQI level may vary based on a prevalence or absence of ozone pollution in a given AQE), or otherwise specified. A minimum AQE may be determined by one or more of a user device 102, a data center 104, Cloud based computing resources, and/or combinations thereof.

In accordance with at least one implementation of the present disclosure, AQI data, which may include RAQD, other non-real-time AQI data, and/or other data, may be captured by IoT sensors 105, communicated to the data center 104 and used by the data center 104 to determine routing options for a given user 101 that, per a current or scheduled AQEEP, is scheduled to transit through one or more AQEs, at a given current or future time. AQI data, including RAQD, may be processed automatically, semi-automatically and/or manually into Real-time Air Quality information ("RAQI"). As used herein, RAQI refers to AQI data that is presentable in a humanly perceptible manner, such as verbally, visually, or otherwise. RAQI may be presented to a user during an AQEEP by a user device 102 or other audio-visual input/output devices as described further below. RAQI may be derived from any available AQI data, including, by example not by limitation, RAQD.

For example, and not by limitation, RAQI may include information generated, in whole or in part, from Satellite Air Quality Data ("SAQD"). The SAQD may be captured by a satellite 107, communicated to one or more of a user device 102, a data center 104, and/or Cloud resources and processed individually and/or collectively thereby to determine a RAQI for one or more AQEs. In at least one implementation, such determining may include use of RAQD and/or other AQI data for a given AQE. A user device 102 may present RAQI in a humanly perceptible form to a user 101, such as visibly, audibly, using augmented reality or virtual reality, or the like. For example, and not by limitation, SAQD may be used to capture and present RAQI that depicts locations and densities of smoke from one or more wildfires and inform the user 101, based e.g., on RAQD for a given AQE, of impacts from such smoke on the current and/or expected AQI for a given one or more AQEs. Such information may be used by the user device 102 to accordingly route the user from a current location to a destination.

Satellite and other image data may be captured across any desired range of the electromagnetic spectrum including, but not limited to, the human visible perceptible range, the infrared range, X-Ray ranges, or otherwise. Such image data may be converted into any desired humanly perceptible image format and presented as RAQI to a user 101, via their user device 102 and/or other external devices coupled thereto. Non-limiting examples of humanly perceptible image information include still, moving, time-lapse, time-warp, slow-motion, and other image and/or video (moving picture), graphic and other human visually perceptible formats.

It is to be appreciated that other forms of real-time data and real-time information may be provided to a user before, during and after an AQEEP. Non-limiting examples of such data and information include environmental data, such as temperature, rate of temperature change, wind conditions, humidity conditions, water depth, current and tide characteristics, and other forms of environmental data and information. Any form of environmental data capture, communication, preservation, and presentation technologies may be utilized with one or more implementations of the present disclosure to provide real-time environmental information to a user 101.

For at least one implementation, RAQD and RAQI may include one or more of various delineable sub-categories of information, such as location, structure (such as the IAE maintained for a given building), user profile, hazard, and other categories of data and information. For a non-limiting example, "location data" and "location information" may include data and information identifying street and road existing within a given AQE and a level of congestion thereof.

For at least one implementation, RAQD and RAQI may include "population data" and "population information." Such population data may include, for example, typical commute times, commuting directions, or other data that impacts an AQI for an AQE over any given time period.

For at least one implementation, RADQ and RAQI may include user profile data and user profile information such as known medical conditions, allergies, and/or other air related medical sensitivities, issues, warnings, or concerns.

For at least one implementation, real-time data and real-time information may include "hazard data" and "hazard information." Hazard data may include, for example and not by way of limitation, any data indicative of any known, detectable, or otherwise arising air-based hazards at a current location, along a route, and/or at a destination.

User Device 102

Figure 4:
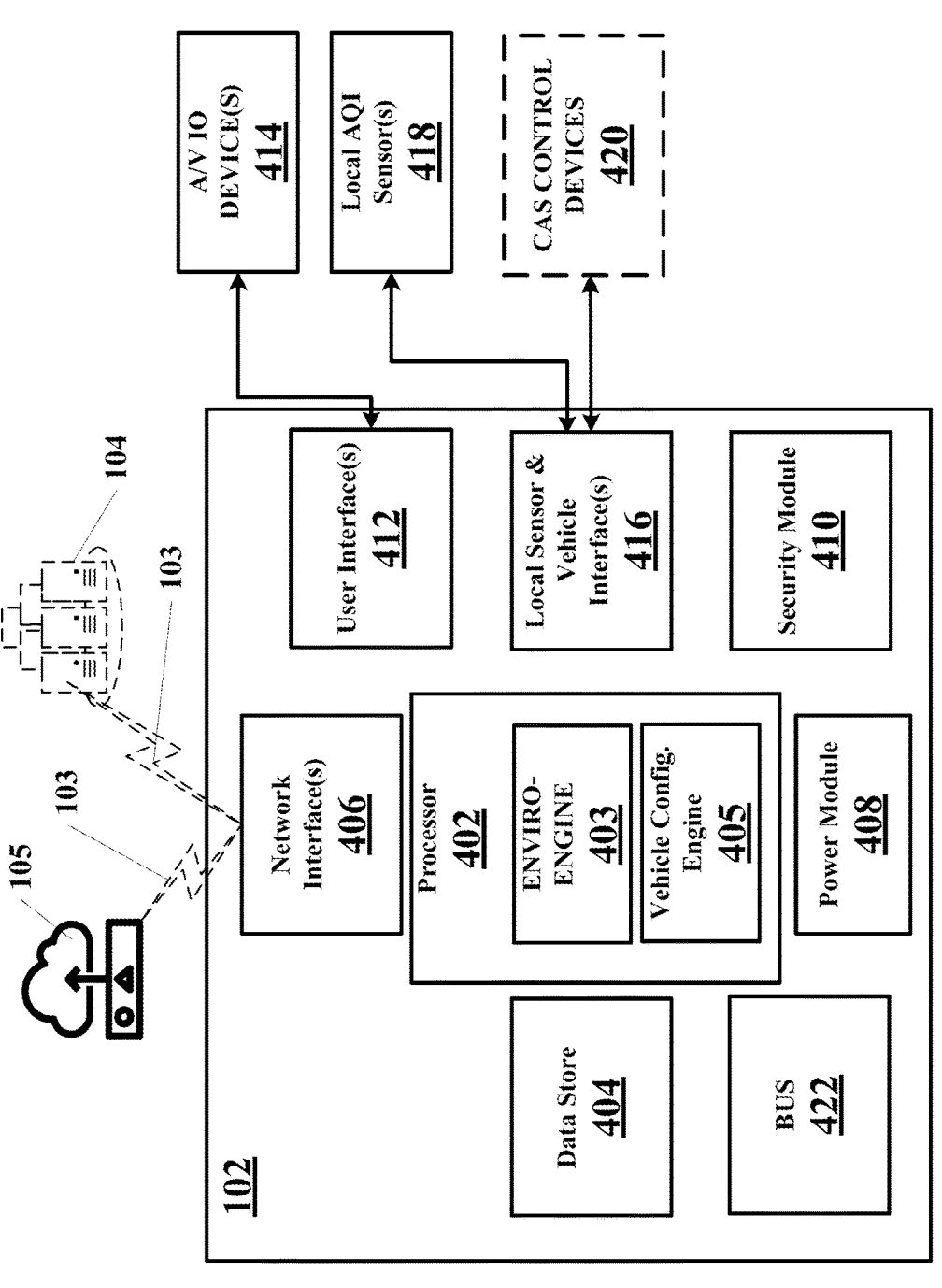
FIG. 4 is a schematic representation of components of a user device configured for facilitating navigation in view of air quality and in accordance with at least one implementation of the present disclosure.

As shown in FIG. 4 for at least one implementation of the present disclosure, a user device 102 may include one or more physical and/or virtual components. As used herein, "user Device" refers to a device configured for use by a human being to one or more of communicate, process, and store ADI data and RAQD and present such data to a user 101 as RAQI. Non-limiting examples of user devices include smartphones, laptop computers, tablet computing devices, desktop computers, smart televisions, smart glasses, virtual reality glasses, augmented reality glasses, earbuds/headphones and other audible output devices, and other devices.

A user device 102 includes one or more processors 402, data stores 404, network interfaces 406 (that may be coupled to one or more IoT sensor(s) 105, data center(s) 104, satellite systems 107, and the like), power modules 408, security modules 410, user interfaces 412 (that may be coupled to one or more internal and/or external A/V IO devices 414), local sensors 418, CAS control devices 420 (as further described below), a bus 422, and the like.

Processor 402

As used herein, "processor" refers to one or more known or later developed hardware processors and/or processor systems configured to execute one or more computer instructions, with respect to one or more instances of computer data, and perform one or more logical operations. The computer instructions may include instructions for executing one or more applications, modules, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; micropro- cessors, microcontrollers; and the like. Processors may be implemented in single or parallel or other implementation structures, including distributed, Cloud based, and other- wise. A reference herein to "a" processor may include computer instructions performed singularly and/or collec- tively by one or more hardware devices. A reference herein and/or in a claim to "the processor" performing a given computer instruction may include one or more processors singularly and/or collectively performing such computer instructions, in whole or in part.

As used herein an "instruction" (which is also referred to herein as a "computer instruction") herein refers to a non- transient processor executable instruction, associated data structure, sequence of operations, program modules, or the like. A computer instruction may be stored by a data store 404. An instruction is described by an instruction set. It is commonly appreciated that instruction sets are often pro- cessor specific and accordingly an instruction may be executed by a processor in an assembly language or machine language format that is translated from a higher-level pro- gramming language. An instruction may be provided using any form of known or later arising programming; non- limiting examples including declarative programming, imperative programming, functional programming, proce- dural programming, stack-based programming, object-ori- ented programming, and otherwise. An instruction may be performed by using data and/or content stored in a data store on a transient and/or non-transient basis, as may arise for any given data, content and/or instruction.

As used herein, an "application" refers to a set of com- puter instructions that configure one or more processors or other components of a device, a system, a collection of devices, or otherwise to perform one or more tasks that are other than tasks commonly associated with the operation of the processor, device, system or the like itself (e.g., a "system software," an example being an operating system software), or the providing one or more utilities provided thereby (e.g., a "utility software," an example being a print utility). An application may be bundled with a given device, system, published separately, or otherwise provided. Non- limiting examples of applications include word processing applications (e.g., Microsoft WORD™), video streaming applications (e.g., SLINGTV™), video conferencing appli- cations (e.g., ZOOM™), gaming applications (e.g., FORT- NITE™), and the like.

As used herein, "computer engine" (or "engine") refers to a combination of one or more processors executing one or more computer instruction(s). A computer engine executes computer instructions to perform one or more logical opera- tions (herein, a "logic") which facilitate various actual (non-logical) and tangible features and functions provided by a system, a device, and/or combinations thereof.

As used herein, "module" herein refers to and, when claimed, recites definite structure for an electrical/electronic device that is configured to provide at least one feature and/or output signal and/or perform at least one function including the features, output signals and functions described herein. A module may facilitate the providing of one or more functions using computer engines, processors, computer instructions, device and/or system components, and the like. When a processor provides, in whole or in part, a feature, output signal and/or function, one more software components may be used. A person of ordinary skill in the art (a "POSITA") will appreciate that the specific hardware and/or computer instructions used for a given implementa- tion will depend upon the functions to be accomplished by a given module. Likewise, a POSITA will appreciate that such computer instructions may be provided in firmware, as embedded software, provided in a remote and/or local data store, accessed from other sources on an as-needed basis, or otherwise. Any known or later arising technologies may be used to provide a given module and the features and func- tions supported therein.

Figure 5A:
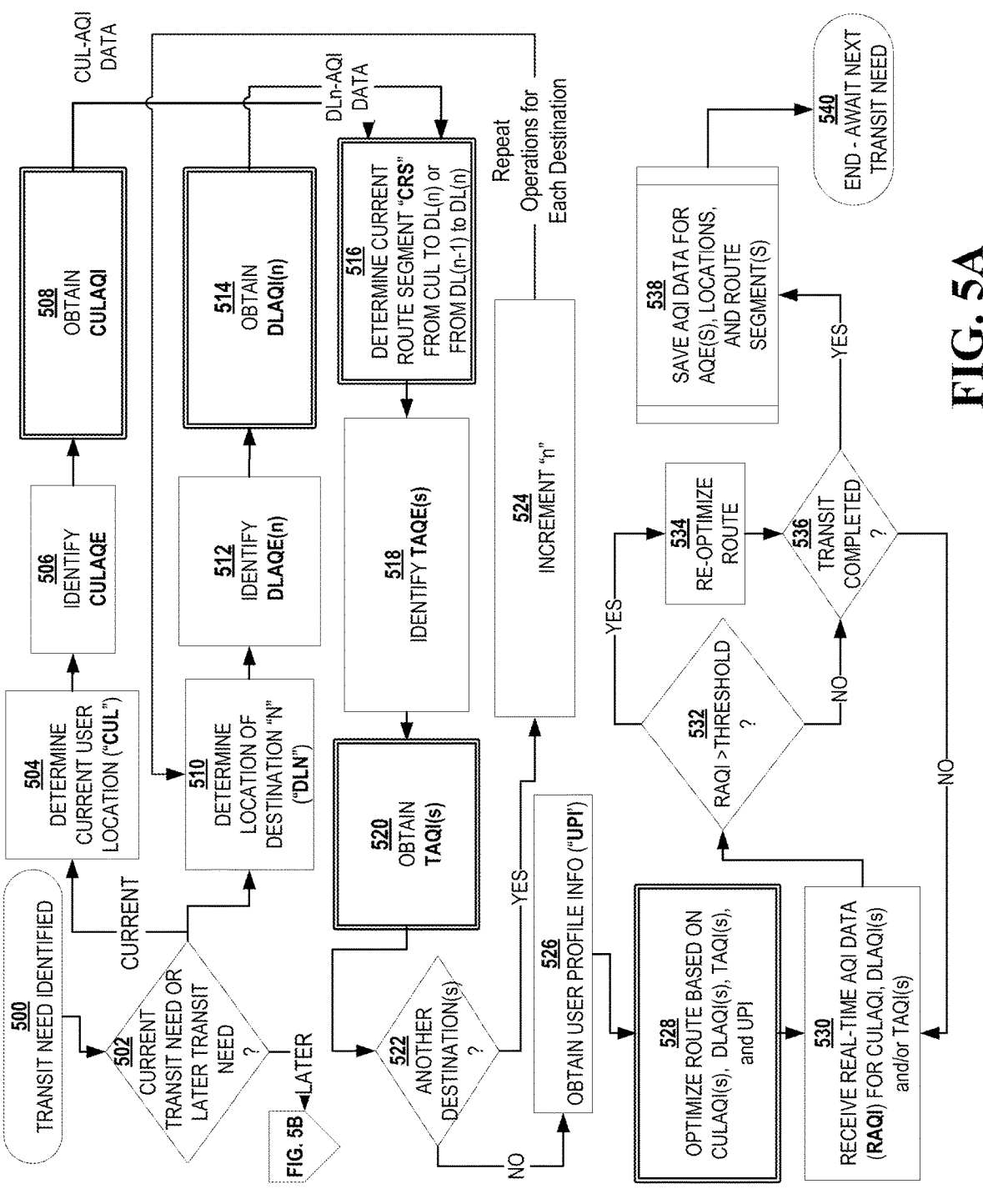
FIGS. 5A and 5B are a flow chart illustrating one implementation of computer executable instructions which instantiate an enviro-engine utilized by a user device to facilitate navigation between two or locations, in view of air quality existing, at a given time, at such locations and/or along one
Figure 5B:
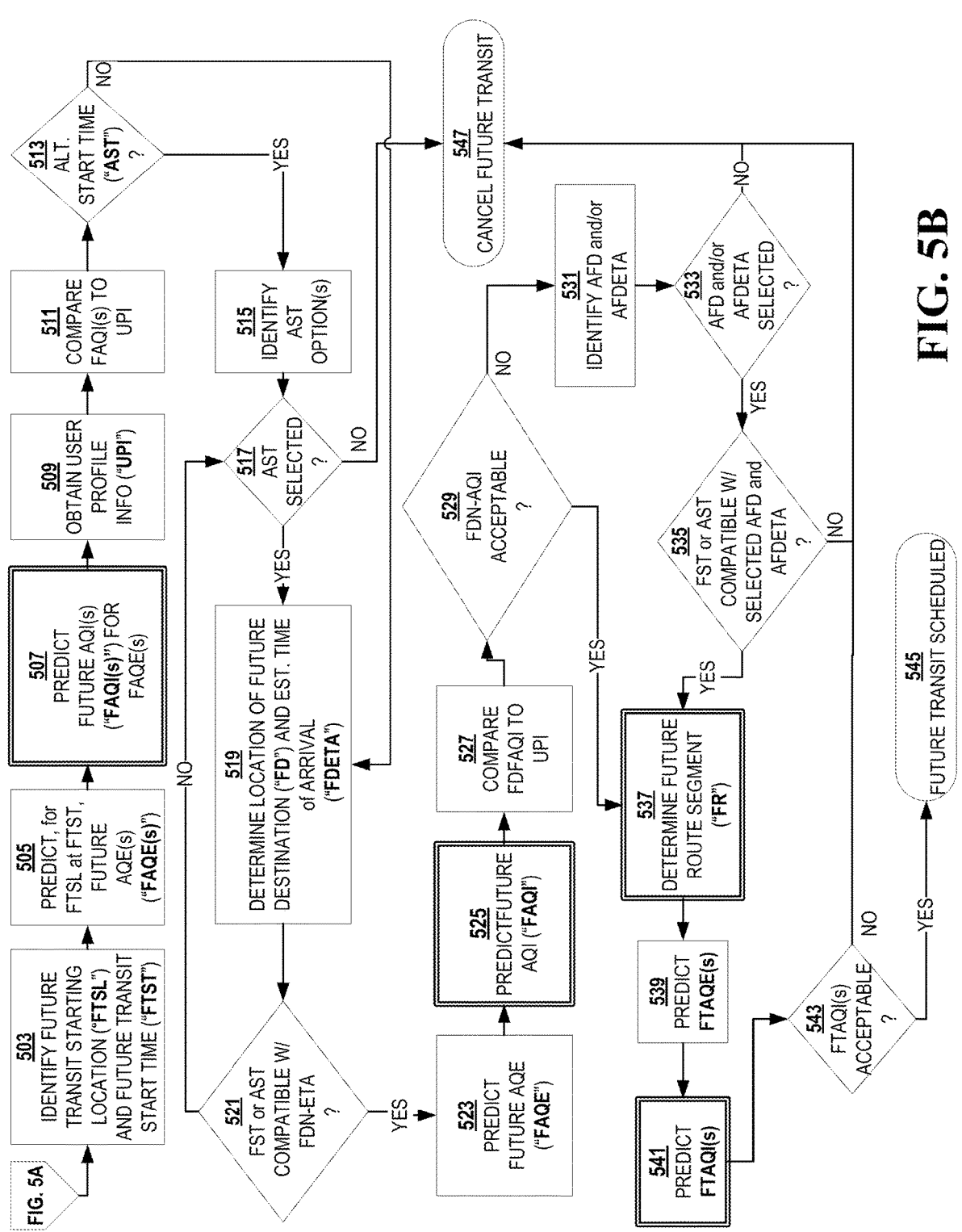

For at least one implementation, the one or more proces- sors 402 may be configured to instantiate an enviro-engine 403. Computer instructions executed by an enviro-engine 403 may instruct a user device 102 to perform operations which facilitate routing of a user through one or more AQEs from a current location to a destination. One implementation of such computer instructions is illustrated in FIGS. 5A and 5B and described further below.

Figure 6:
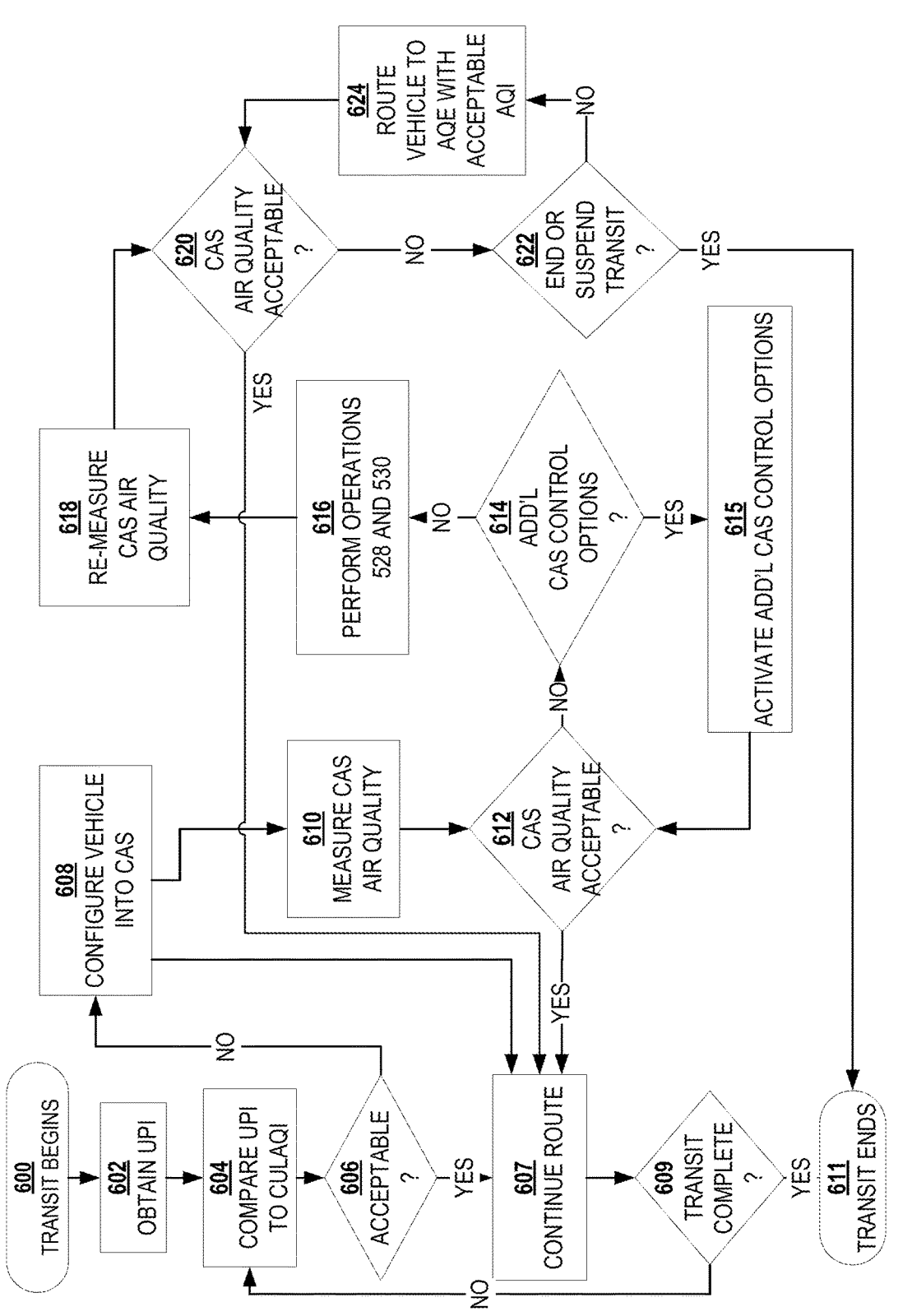

For at least one implementation, the one or more proces- sors 402 may be configured to instantiate a vehicle configu- ration engine 405. Computer instructions executed by the vehicle configuration engine 405 may instruct a vehicle, via the user device 102, to perform one or more operations which configure a vehicle, during an AQEEP, into a CAS. For at least one implementation, such operations may be determined based on AQIs determined for one or more AQEs coinciding with a user current location and during an AQEEP. For example, the instructions may include closing windows, opening windows, engaging vehicle air condition- ing systems, or the like. One implementation of such com- puter instructions is illustrated in FIG. 6 and described further below.

Data Store 404

As used herein, "data store" refers to any device or combinations of devices configured to store data on a temporary, permanent, transient, non-transient, or other basis. Herein, "data store," "storage," "storage module, " "computer readable medium," and the like may be used interchangeably herewith to refer to a device in which data, computer instructions, and the like are stored on a non- transient basis. A data store may store data in any form, such as electrically, magnetically, physically, or otherwise. A data store may include a memory devices, with non-limiting examples including random access memory (RAM) and read only memory (ROM) devices. A data store may include one more storage devices, with non-limiting examples including electrical storage drives such as EEPROMs, Flash drives, Compact Flash (CF), Secure Digital (SD) cards, Universal Serial Bus (USB) cards, and solid-state drives, optical storage drives such as DVDs and CDs, magnetic storage drives such as hard drive discs, magnetic drives, magnetic tapes, memory cards, and others. Any known or later arising memory and data storage device technologies may be utilized for a given data store. Available storage provided by a given one or more data stores may be partitioned or otherwise designated by the storage controller as providing for permanent storage and temporary storage. Non-transient data, computer instructions, or other the like may be suitably stored in a data store. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient data and content. "

As used herein, "data" (which is also referred to herein as a "computer data") refers to any representation of facts, information, or concepts in a form suitable for processing, storage, or the like by one or more electronic device processors, data stores or the like. Data, while and/or upon being processed, may cause, or result in an electronic device or other device to perform at least one function, task, operation, provide a result, or otherwise. Data may be communicated, processed, stored and/or otherwise exist in a transient and/or non-transient form, as determined by any given state of such data, at any given time. For a non-limiting example, a given data packet may be non-transient while stored in a data store, but transient during communication of the given data packet from a first device or system to a second (or more) device or system. When received and stored in memory, data storage device, or otherwise, the given data packet may again have a non-transient state. For example, and not by limitation, data may take any form including as one or more applications, content, or otherwise.

As used herein, "content" refers to data that that may be presented, using a suitable presentation device, to a user in a humanly perceptible format. When presented to a human, the data becomes "information." Content may include, for example and not by limitation, one or more sounds, images, video, graphics, gestures, or otherwise. The content may originate from any source, including live and/or recorded, augmented reality, virtual reality, computer generated, or otherwise. The content may be presented to a given user using any user device and any user interface. Content may be stored, processed, communicated, or otherwise utilized.

Network Interface 406

A network interface 406 may include one or more transponders configured for communicating wirelessly, via one or more couplings (as described herein), with one or more IoT sensors 105, one or more Ethernet ports or the like for communicating with one or more data centers 104, satellite communication components, Cloud resources, and the like.

A "coupling" refers to the establishment of a communications link between two or more elements of a given system. A coupling may utilize any known and/or later arising communications and/or networking technologies, standards, protocols or otherwise. Non-limiting examples of such technologies include packet switch and circuit switched communications technologies, with non-limiting examples including, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used, with non-limiting examples including, the TCP/IP suite of protocols, ATM (Asynchronous Transfer Mode), the Extensible Message and Presence Protocol (XMPP), VOIP, Ethernet, Wi-Fi, CDMA, Z-WAVE, Near Field Communications (NFC), GSM/GRPS, TDMA/EDGE, EV/DO, WiMAX, SDR, LTE, MPEG, BLUETOOTH, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

As used herein, "Cloud" refers to cloud computing, cloud storage, cloud communications, and/or other technology resources which a given user 101 does not actively manage or provide. A usage of a Cloud resource may be private (limited to various users and/or uses), public (available for two or more users and/or uses), hybrid, dedicated, non-dedicated, or otherwise. An implementation of the present disclosure may utilize Cloud resources using any known or later arising data delivery, processing, storage, virtualization, or otherwise technologies, standards, protocols (e.g., the Simple Object Access Protocol (SOAP), the Hyper Text Transfer Protocol ("HTTP"), Representational State Transfer protocol ("REST"), or the like. Non-limiting examples of such technologies include Software as a Service ("SaaS"), Platform as a Service ("PaaS"), Infrastructure as a Service ("IaaS"), and the like. Cloud resources may be provided by one or more entities, such as AMAZON WEB SERVICES provided by Amazom.com Inc., AZURE provided by Microsoft Corp., and others.

Power Module 408

As used herein, "power supply," "power module," and "power" refer to any known or later arising technologies which facilitate the providing and/or the use of electrical energy by a device. Non-limiting examples of such technologies include batteries, power converters, inductive charging components, line-power components, solar power components, and otherwise.

Security Module 410

As used herein, "security component," "security module," and "security" refer to any known or later arising processors, computer instructions, and/or combinations thereof configured to secure data as communicated, processed, stored, or otherwise manipulated by a user device, data center, Cloud resource, combinations thereof, or otherwise. Non-limiting examples of security components include those implement encryption standards, such as an Advanced Encryption Standard (AES), transport security standards, such as Transport Layer Security (TLS) or Secure Sockets Layer (SSL).

User Interface 412

As used herein, "user Interface" refers to one more components, provided with or coupled to a device configured to receive information from and/or present information to a user. A user interface may include one more "Other I/O interfaces" (OIOI), "Audio I/O interfaces" (AIOI), and "Visual I/O interfaces" (VIOI).

As used herein, an Other Input/Output interface" (OIOI) refers to one or more components, provided with or coupled to a user device 102, configured to support a receiving and/or presenting of additional inputs and outputs to and from one or more users 101. An IOI may be configured to support the receiving and presenting of RAQI to a user 101 using one or more audio, visual, audio-visual (A/V) or other forms of input/output device(s).

A RAQI may include an audible signal and/or a visible signal with either signal being communicated separately or collectively therewith to a user 101. An OIOI may include any interface not otherwise categorized as an AIOI or a VIOI with non-limiting examples including touch pads, keyboards, sensors, motion detectors, tactile elements, and the like. Any known or later arising technologies configured to convey information to or from one or more users as RAQI may be utilized for at least one implementation of the present disclosure. An OIOI generally includes hardware and computer instructions (herein, "OIOI technologies") which supports the input and output of other signals with a user.

A/V IO Devices 414

As used herein, "A/V IO Devices" refers to one or more AIOIs and/or VIOIs. An AIOI and/or VIOI may be integrated in a user device 102 and/or externally provided by another device or system, such as a display in a vehicle coupled to a user device 102 which provides mapping and RAQI to a user 101.

As used herein, "audio I/O interface (AIOI)" refers to one or more components, provided with and/or coupled to an electronic device, configured to support a receiving and/or presenting of humanly perceptible audible content to one or more users. Such audible content (which is also referred to herein as being "audible signals") may include spoken text, sounds, or any other audible information. Such audible signals may include one or more humanly perceptible audio signals, where humanly perceptible audio signals typically arise between 20 Hz and 20 KHz. The range of humanly perceptible audio signals may be configurable to support an audible range of a given individual user. An AIOI generally includes hardware and computer instructions (herein, "audio technologies") which supports the input and output of audible signals, respectively, from and to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An AIOI may use one or more microphones and speakers to capture and present audible signals respectively from and to a user. Such one or more microphones and speakers may be provided by a given device itself or by a device communicatively couple additional audible device component. For example, earbuds may be communicatively coupled to a smartphone, with the earbuds functioning as an AIOI and capturing and presenting audio signals as sound waves to and from a user, while the smartphone functions as a user device 102. An AIOI may be configured to automatically recognize, and capture comments spoken by a user and intended as audible signals for sharing with other users, inputting commands, or otherwise.

As used herein, "visual I/O interface (VIOI)" herein refers to one or more components, provided with or coupled to a device, configured to support a receiving and/or presenting of humanly perceptible visual content to one or more users. A VIOI may be configured to support the receiving and presenting of visual content (which is also referred to herein as being "visible signals") to users. Such visible signals may be in any form, such as still images, motion images, augmented reality images, virtual reality images, and otherwise. A VIOI generally includes hardware and computer instructions (herein, "visible technologies") which supports the input by and output of visible signals to users via a device. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A VIOI may be configured to use one or more display devices, such as an internal display and/or external display for a given device with the display(s) being configured to present visible signals to a user. A VIOI may be configured to use one or more image capture devices to capture content. Non-limiting examples of image capture devices include lenses, cameras, digital image capture and processing software, and the like. Accordingly, it is to be appreciated that any existing or future arising VIOIs, devices, systems and/or components may be utilized by and/or in conjunction with a device to facilitate the capture, communication and/or presentation of visible signals to a user.

Local Sensor and Vehicle Interfaces 416

A user device 102 may include one or more local sensor and vehicle interfaces which are configured to couple the processor to one or more local sensors 418 and to one or more CAS control devices 420 when the user device 102 is located within a short-range wireless communications distance. As used herein a "short-range wireless communications distance" refers to a distance of less than five (5) feet as may be facilitated by use of BLUETOOTH, NEAR FIELD COMMUNICATIONS and similar technologies.

A local sensor 418 may include any type of sensor which can capture data relevant to determining a routing for a given user through one or more AQEs from a current location to a destination. A non-limiting example of a local sensor includes one or more image sensors configured to capture, monitor, detect and/or process image-based aspects of a given AQE. Image sensors may operate with respect to motion, still, intermittent, or other image capture protocols. Image sensors may be provided for any desired field-of-view, such as a frontal view, a 360-degree view, or otherwise. Image sensors (not shown) may provide for visual field monitoring in any desired wavelengths of the electromagnetic spectrum, including and not limited to visible wavelengths, infra-red wavelengths, and otherwise. Wavelengths and/or spectrums utilized by an image sensor may vary based upon a then arising AQE, time of day, user preference, or otherwise. For example, during daytime, an image sensor may utilize human visible wavelengths, whereas during nighttime, foggy or other diminished light conditions, infra-red or other wavelengths may be additionally and/or alternatively utilized. Images captured by an image sensor may be proceed by image processing capabilities provided by an image sensor itself, or by capabilities provided, in whole or in part or in combination with any of the user device 102, the data center 104, on the Cloud, and/or otherwise.

Another non-limiting example of a local sensor may include one or more physio sensors configured to capture, monitor, detect and/or process physiological-based aspects of a user at any given time or over any given period (herein, "physio-aspects"). Examples of such physio-aspects include a user's perspiration rate, heart rate, blood pressure, brain waves, forces exerted by or on the user, and otherwise. Physio-aspects may arise persistently, intermittently, or otherwise. Data from one or more physio sensors may be processed by processing capabilities provided by a physio sensor (not shown), the user device 102, the data center 104, on the Cloud, and/or otherwise.

Another non-limiting example of a local sensor may include one or more location sensors configured to capture, monitor, detect and/or process a user's location in an AQE. Examples of location sensors include those using global positioning satellite (GPS) system data and otherwise. Data from location sensors may be processed by processing capabilities provided by a location sensor (not shown), the user device 102, the data center 104, on the Cloud, and/or otherwise.

Another non-limiting example of a local sensor may include one or more motion sensors configured to capture, monitor, detect and/or process a user's change of motion or orientation, such as by acceleration, deceleration, rotation, inversion or otherwise in a given user's current total environment. A non-limiting example of a motion sensor is an accelerometer. Data from motion sensors may be processed by processing capabilities provided by a motion sensor (not shown), the user device 102, the data center 104, on the Cloud, and/or otherwise.

For at least one implementation, a user device 102 may be coupled to a CAS control device 420 which configures an indoor air space, such as the airspace in a vehicle, to be a CAS that satisfies a given IAQ level. Non-limiting examples of CAS control devices 420 include powered windows, cabin air filters, air circulation systems in a vehicle.

Bus 422

As used herein, "bus" refers to any known and/or later arising technologies which facilitate the transfer of data between components within a user device 102 such as from a processor 402 to a data store 404. Non-limiting examples include Universal Serial Bus (USB), PCI-Express, Compute Express Link (CXL), IEEE-488 bus, High Performance Parallel Interface (HIPPI), and the like.

Data Center 104

As used herein a data center 104 refers to a collection of one or more servers. "Server" herein refers to one or more devices that include computer hardware and/or computer instructions that provide functionality to one or more other programs or devices, such as a user device 102 (collectively, "clients"). Non-limiting examples of servers include database servers, file servers, application servers, web servers, communications servers, virtual servers, computing servers, and the like. Servers may be combined into clusters (e.g., a server farm), logically or geographically grouped, or otherwise. Any known or later arising technologies may be used for a server.

A server may instantiate one or more computer engines as one or more threads operating on a computing system having a multiple threaded operating system, such as the WINDOWS, LINUX, APPLE OS, ANDROID, and other operating systems, as an application program on a given device, as a web service, or otherwise. An Application Program Interface (API) may be used to support one or more implementations of the present disclosure. A server may be provided in the virtual domain and/or in the physical domain. A server may be associated with a human user, a machine process executing on one or more computing devices, an API, a web service, instantiated on the Cloud, distributed across multiple computing devices, or otherwise.

A server may be any electronic device configurable to communicate data using a network, directly or indirectly, to another device, to another server, or otherwise.

"Substantially simultaneous(ly)" herein refers to an absence of a greater than expected and humanly perceptible delay between a first event or condition, such as a completion of a gaming activity, and a second event or condition, such as a presentation of a bet settlement for a bet placed with respect to the gaming activity. Substantial simultaneity may vary in a range of quickest to slowest expected delay, to a moderate delay, or to a longer delay. For at least one implementation, substantial simultaneity occurs within an acceptable delay (as described above).

As shown in FIGS. 5A and 5B, one implementation of computer executable instructions which instantiate an enviro-engine utilized by a user device to facilitate navigation between two or locations, in view of air quality existing, at a given time, at such locations and/or along one or more route segments therebetween may be initiated when a transit need is identified by the user device 102 (as per Operation 500). The transit need may be identified based upon an input to the user device 102. For example of such input(s) may include: detected user actions, such as a user 101 grabbing a coat out of a closet, picking up car keys, or the like; calendared actions, such as a user entry on a calendaring software application, with non-limiting examples including MICROSOFT OUTLOOK and GOOGLE CALENDAR; user inputs, such as a user querying the user device 102 for routing instructions; predicted user behaviors based upon past user behaviors, such as a user commonly departing to or from work on given weekdays and within certain periods; inputs from other user devices, systems; and/or other inputs indicative of a need for a given user to transit from a current location to at least one destination.

Per Operation 502, the process may include determining whether the transit need refers to a current transit need or a later transit need. Herein, a "current transit need" is a transit need occurring substantially at the current time and/or within a given transit period thereof. For at least one implementation, a given transit period includes thirty (30) minutes after the current time. The given transit period may be fixed, adjustable, specified by a user, or otherwise set. The later transit need may be a transit need occurring at a time arising later than the given transit period. When the transit need is a current transit need, the process continues with Operations 504 and 510. For at least one implementation, Operations 504 and 510 may be executed in parallel, serially, or otherwise, with parallel operations being shown in FIG. 5A for purposes of illustration. When the transit need is a later transit need, the process continues with Operation 503 (as shown in FIG. 5B).

Per Operation 504, the process may include determining a current user location ("CUL"). The CUL may be determined based upon user input, location data such as that provided using mobile phone location technologies, using navigation systems such as the Global Positioning System, GOOGLE MAPS, and the like, predicted based on current and/or past user behaviors, and otherwise determined.

Per Operation 506, the process may include identifying at least one air quality environment for the current user location ("CULAQE"). As discussed above, any number of AQEs may correspond to a given location at any time and Operation 506 may include identifying multiple CULAQEs.

Per Operation 508, the process may include obtaining an air quality index (AQI) for the CULAQEs identified in Operation 506 and designating such AQI as the air quality index for the user's current location ("CULAQI") data.

When multiple CULAQEs are identified, per Operation 506, the CULAQE having the highest rated (most polluted) AQI may be designated as the CULAQI data. For another implementation, when multiple CULAQEs correspond to a given CUL, an average or other statistical figure based on the AQIs for the CULAQEs may be determined and designated as the CULAQI data. As shown, the CULAQI data may be a first input for use in determining a route segment, as per Operation 516.

Per Operation 510, the process may include determining one or more ("n") destination locations ("DL(n)"). The DLn may be determined based upon user input, calendar entries, predicted based on current and/or past user behaviors, and otherwise determined. For an implementation, multiple destinations, and destination locations DL(n) may be determined.

Per Operation 512, the process may include identifying at least one air quality environment for the given destination location ("DLAQE(n)"). As discussed above, any number of AQEs may correspond to a given location at any time and Operation 512 may include identifying multiple DLAQEs.

Per Operation 514, the process may include obtaining an air quality index (AQI) for the DLAQE(n) identified in Operation 512 and designating such AQI as the air quality index for the destination location ("DLAQI(n)") data. When multiple DLAQEs are identified, per Operation 512, the DLAQE having the highest ranked (most polluted) AQI may be designated for use as the DLAQI data. For another implementation, when multiple DLAQEs correspond to a given DL, the DLAQEs may be rank ordered, ordered based on an average or other statistical figure based on the AQIs for the DLAQEs, or otherwise ordered. As shown, the DLAQI data may be a second input for use in determining a route segment, as per Operation 516.

Per Operation 516, the process may include determining a current route segment ("CRS") based on the CULAQI data, the DLAQI(n) data and/or the DLAQI(n−1) data. The CRS may be determined in view of any factor or sets of factors including, but not limited to, distance, time of travel, distance versus AQI exposure, travel time versus AQI exposure, or otherwise.

Per Operation 518, the process may include identifying a transient AQE ("TAQE"). As used herein, a TAQE is a unique AQE that geographically exists, at a given time (or is predicted to potentially exist at a later time for a later need) between a CUL and a DL and/or between two or more DLs along a CRS.

Per Operation 520, the process obtaining an air quality index (AQI) for the TnAQE identified in Operation 518 and designating such AQI as the transient air quality index ("TAQI") data. When multiple TAQE(s) are identified, per Operation 518, the TAQE having the highest rated (most polluted) AQI may be designated as the TAQI data. For another implementation, an average or other statistical figure based on the AQIs for the TAQE(s) may be determined and designated as the TAQI data.

Per Operation 522, the process may include determining if the current transit need includes another destination. If "YES," the process may include Operation 524 and repeats Operations 510, 512, 514, 516, 518, 520 and 522. If "NO," the process proceeds to Operation 526.

Per Operation 524, the process may include incrementing "n" to identify a next destination location as used in determining a next route segment (Rn+1) and identifying TAQEs and TAQIs along the next route segment.

Per Operation 526, the process may include obtaining user profile information ("UPI"). The UPI may be stored in the data store 404, obtained from the data center 104, obtained from the Cloud, or otherwise. For at least one implementation, the UPI may identify one or more characteristics of a given user, such as health conditions, transit preferences, transit options, and/or other data useful in determining routing options for the given user between a current location and one or more destinations.

Per Operation 528, the process may include optimizing one or more route segments (Rn(s)) for the current transit need based on one or more of the CUL-AQI, DN-AQI and TQAI data determined, respectively, per Operations 508, 514 and 520. The optimization of the one or more route segments (Rn) may occur linearly, in parallel, iteratively, or otherwise. AI/ML may be utilized to optimize the one or more route segments (Rn). For at least one implementation, optimization of the route segments may occur in view of the UPI obtained per Operation 526.

Per Operation 530, the process may include receiving real-time AQI ("RAQI") data. The RAQI data may be received before and/or during execution (i.e., the user transiting) of the current transit need. The RAQI may be received for one or more of the CL-AQI, DLn-AQI(s), and/or TnAQI(s).

Per Operation 532, the process may include determining whether the RAQI is greater than a given threshold. The given threshold may be predetermined, user specified, statistically or otherwise determined, specified by the data center 104 or a Cloud resource, fixed or otherwise determined. When the RAQI exceeds the threshold, the process may include Operation 534. Otherwise, the process proceeds to Operation 536.

Per Operation 534, the process may include re-optimizing the route between one or more of the user's current location and a given destination and/or between two or more destinations. For at least one implementation, re-optimization may include one or more of Operations 510-528 with respect to the route segments Rn affected by the RAQI.

Per Operation 536, the process may include determining whether the current transit has been completed. For at least one implementation, the current transit may be deemed completed when the user reaches a given destination location, as identified in the transit need. For another implementation, the current transit may be deemed completed when indicated by the user, or otherwise indicated. If transit is not completed, the process may return to Operation 530. If the transit is completed, the process may include Operation 538.

Per Operation 538, the process may include saving one or more instances of the AQI data determined and/or collected during the transit, the locations, the route segments utilized, and the like. Such saved data may be used the user device 102, the data center 104 and/or Cloud resources in determining and optimizing route segments for later occurring transit needs.

As shown in FIG. 5B, for a later arising transit need and per Operation 503, the process may include identifying a future transit starting location ("FTSL") and a future transit start time ("FTST"). Identification of the FTSL and FTST may occur based on calendar entries, user input, predicted invents (e.g., common commuting times), third-party invites to events, meetings, or the like, or based on other inputs received from the data center 104 and/or the Cloud.

Per Operation 505, the process may include predicting one or more future AQE(s) ("FAQE(s)") based on the identified FTSL and FTST. The FAQE(s) may be predicted based on historical AQE(s) for a given location. AI/ML may be used to predict the FAQE(s) based on historical AQE data, predicted weather, predicted congestion levels, and the like.

Per Operation 507, the process may include predicting future AQI(s) ("FAQI(s)") for the predicted FAQE(s). The FAQI(s) may be predicted based on historical AQI(s) for a given location. AI/ML may be used to predict the FAQI(s) based on historical AQI data, predicted weather, predicted congestion levels, and the like.

Per Operation 509, the process may include obtaining user profile information (UPI).

Per Operation 511, the process may include comparing FAQI(s) to the UPI.

Per Operation 513, the process may include determining whether to identify an alternative start time ("AST") based on the UPI. For a non-limiting example, the UPI may include data indicating that the user prefers not to travel during times when ozone pollution levels are above a given level—as indicated in the UPI. If "YES," the process may proceed to Operation 515. If "NO," the process may proceed to Operation 519.

Per Operation 515, the process may include identifying one or more AST options (if any).

Per Operation 517, the process may include selecting one of the one or more (when available) AST options. Selection or non-selection, as the case may be, of an AST option may be based on a user input, based on UPI, generated by a data center 104 or the Cloud, determined using AI/ML based on past user selections, specified by another (e.g., a mandatory selection by an authority), or otherwise selected. If an AST option is selected (as indicated by a "YES"), the process may proceed to Operation 519. If an AST option is not selected (as indicated by a "NO"), the process may proceed to Operation 547 and the future transit may be cancelled, as none of the present AST options (in view of the UPI) were deemed acceptable to the user for the given future transit.

Per Operation 519, the process may include determining a location of one or more future destinations (each an "FD"). The one or more future destinations may be identified for a given future transit need (e.g., the user is to transit from home (a FTSL) to a store (e.g., a first future destination (FD1)), and then to a work destination (a second future destination (FD2)). The process may also include identifying an estimated time of arrival (ETA) at one or more of the FDs (designated herein for each FD as a "FDETA").

Per Operation 521, the process may include determining whether the FST or AST (when chosen) is compatible with the one or more FDETAs. If compatible (as indicated by the "YES"), the process proceeds to Operation 523. If not compatible (as indicated by the "NO"), the process returns to Operation 517.

Per Operation 523, the process may include predicting AQE(s) for the one or more FD(s) at the FDETA(s) (each prediction herein an "FAQE"). It is to be appreciated that an AQE(s) for a given FD may be predicted to be steady state over a given period (e.g., when wind is not present at a given FD) or to change of a given period (e.g., when wind is predicted to blow pollution into or out of a given FD). The AQE for the FD may accordingly be predicted to vary over time and/or other predicted events.

Per Operation 525, the process may include predicting future AQI(s) for the FAQE(s) (each prediction herein an "FAQI").

Per Operation 527, the process may include comparing the one or more FAQI(s) to the UPI.

Per Operation 529, the process may include determining whether a given of the one or more FAQIs is acceptable to the user. If "YES," the process may proceed to Operation 537. If "NO," the process may proceed to Operation 531.

Per Operation 531, the process may include identifying one or more alternate future destinations (each herein an "AFD") and/or alternate future destination ETAs ("AFDETA").

Per Operation 533, the process may include selection of one or more of the AFDN(s) and the one or more AFDN-ETA(s). Selection or non-selection, as the case may be, of an AFDN and/or AFDN-ETA may be based on a user input, based on UPI, generated by a data center 104 or the Cloud, determined using AI/ML based on past user selections, specified by another (e.g., a mandatory selection by an authority), or otherwise selected.

Per Operation 535, the process may include determining whether the FST or AST, as the case may be, is compatible with the selected AFDN and AFDN-ETA. If "YES," the process may proceed to Operation 537. If "NO," the process may proceed to Operation 547.

Per Operation 537, the process may include determining a future route segment ("FR"). The FR may be determined between each of the FTSL and a first future destination (FD1) and thereon between each successive future destinations only route segments to a final destination, for a given future transit need, have been identified.

Per Operation 539, the process may include predicting one or more future transient AQE(s) (each being an "FTAQE") along each of the one or more FR(s). The FTAQE(s) may be predicted using AI/ML based on historical AQE data, weather data, congestion data, and the like.

Per Operation 541, the process may include predicting one or more future transient AQI(s) (each being an "FTAQI") for each of the FTAQE(s).

Per Operation 543, the process may include determining whether the FTAQI(s) are acceptable. For at least one implementation such determination may be made based on UPI. If "YES," the process may proceed to Operation 545. If "NO," the process may proceed to Operation 547.

Per Operation 545, the process may terminate with the future transit being scheduled. When the FTST qualifies as a current transit need, the operations of FIG. 5A may be performed. For at least one implementation, one or more of the future transit need operations described herein may be repeated for a given implementation until the FTST qualifies as a current transit need. Such repetition may occur upon user request, a change in a user's future transit needs (e.g., an addition, subtraction, or modification of a future transit need), in view of changes in or between one or more FD(s), or otherwise.

As shown in FIG. 6, one implementation of computer executable instructions which instantiates a vehicle configuration engine utilized by a user device to configure a vehicle, before, during and after transit between two or more locations in view of AQI(s) occurring at one or more AQE(s) situated along one or more current route segments (CR(s)) may be initiated when a transit begins (as per Operation 600).

Per Operation 602, the process may include obtaining user profile information (UPI).

Per Operation 604, the process may include comparing the UPI to the current user location Air Quality Index (CULAQI).

Per Operation 606, the process may include determining whether the CULAQI is "acceptable." For at least one implementation, "acceptable" may be determined when the CULAQI is below a given AQI level. For a non-limiting example, a CULAQI below an NWS level 3 AQI may be deemed "acceptable" for a first user that does not have any respiratory conditions while being deemed "unacceptable" for a second user that has asthma. Accordingly, for at least one implementation, UPI may be used (when available) in determining whether an CULAQI is or is not "acceptable." For another implementation, a CULAQI at or above a given predefined level, such as NWS level 4, may be deemed unacceptable for all user. When "acceptable" (as indicated by a "YES"), the process may proceed to Operation 607. When "unacceptable" (as indicated by a "NO"), the process may proceed to Operation 608.

Per Operation 607, the process may include the user continuing on the current transit route segments.

Per Operation 609, the process may include a periodic determination as to whether the current transit is completed. If "YES," the process may proceed to Operation 609. If "NO," the process may return to Operation 604.

Per Operation 611, the process is completed when the current transit need is completed.

Per Operation 608, the process may include configuring the vehicle such that a controlled air space (CAS) is established therein. For at least one implementation, establishment of a CAS may include the user device 102 instructing a vehicle to take one or more action with non-limiting examples including closing windows, activating cabin air recirculation, activating one or more air filters, or taking other measures.

Per Operation 610, the process may include, when available for a given vehicle, measuring the air within the CAS formed within the vehicle.

Per Operation 612, the process may include determining if the CAS air quality is acceptable. If "YES," the process may continue with Operation 607. If "NO," the process may proceed to Operation 614.

Per Operation 614, the process may include determining if any additional CAS control options are available for the user. Such options may include those provided by a vehicle and/or options available to the user that are not provided by the vehicle with non-limiting examples including the use of face masks, use of separately provided bottled air and/or oxygen, the use of inhalers, and the like. Such additional control measure may be identified in the UPI, specified by the user 101, the user device 102, the data center 104, Cloud based resources, or otherwise. If "YES," the process may proceed to Operation 615. If "NO," the process may proceed to Operation 616.

Per Operation 615, the process may include activating (and/or utilizing or deploying) one or more of the additional control options. The process then may proceed with Operation 612.

Per Operation 616, the process may include performing Operations 528 and 530 whereby the current route may be optimized (when possible). Such optimization may include identifying one or more different route segments or the like as described above.

Per Operation 618, the process may include re-measuring the CAS air quality.

Per Operation 620, the process may include determining if the CAS air quality is acceptable. If "YES," the process may proceed with Operation 607. If "NO," the process may proceed with Operation 622.

Per Operation 622, the process may include determining whether the current transit should be ended. If "YES," the transit is ended and the process may proceed with Operation 611 and the current transit ending, at which instance the user 101 may specify a new destination, such as a return to a home or work location where an IAE is acceptable. If "NO," the process may proceed to Operation 624.

Per Operation 624, the transit may be suspended, and the process may include the user device 102 instructing the vehicle to an AQE with an acceptable AQI such that, upon arrival therein, the CAS may be lowered to an acceptable level and the process resumes with Operation 620.

It is to be appreciated that the operations depicted in FIGS. 5A and 5B and FIG. 6 are illustrative only and are not intended herein to occur, for all implementations of the present disclosure, in the order shown, in serial, or otherwise. One or more operations may be performed in parallel, and operations may not be performed, as provided for a given implementation, a given transit, or otherwise.

Although various implementations have been described above with a certain degree of particularity, or with reference to one or more individual implementations, those skilled in the art could make numerous alterations to the disclosed implementations without departing from the spirit or scope of the claimed invention(s), as set forth in the as filed and/or later presented and/or amended claims in this application and/or an application claiming priority hereto.

The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various implementations described herein. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that all matter contained in the above description and shown in the accompanying drawings shall be interpreted as illustrative and not limiting. Changes in detail or structure may be made without departing from the basic elements of the invention as defined in the claims.

The invention claimed is:

1. A process, for routing a user from a current location to at least one destination, comprising:

determining, by a user device, a current user location ("CUL") of a user;

receiving, by the user device, for the CUL, first digital mapping data identifying a current user location air quality environment ("CULAQE");

wherein a geographic area corresponding to the CULAQE varies over time with weather changes;

determining, by the user device, while the user device is located within the CULAQE, and based on air quality data received from at least one Internet-of-Things ("IoT") sensor within direct wireless range of the user device, a current user location air quality index ("CU-LAQI");

determining, by the user device, a destination location ("DL") for a destination;

receiving, by the user device, second digital mapping data identifying a destination location air quality environment ("DLAQE");

wherein a geographic area corresponding to the DLAQE varies over time with weather changes;

determining, by the user device, for the DLAQE, a plurality of destination location air quality indexes ("DLAQI(s)") including a first destination location air quality index ("DLAQI(1)") and a plurality of additional destination location air quality indexes ("DLAQI(n)");

wherein the DLAQI(1) is determined based on at least one past condition for the DLAQE;

wherein the plurality of DLAQI(n) are continually determined while the user device travels from the CUL to the DL;

determining, by the user device, a plurality of route segments ("RS"), including a current route segment ("CRS") and a plurality of transient route segment ("TRS(n)"), from the CUL to the DL;

determining, by the user device, a first optimization of the plurality of RS based on the CULAQI and the DLAQI (1);

receiving, by the user device and for each of the plurality of TRS (n), third digital mapping data identifying a plurality of transient air quality environment ("TAQE(s)") including a first transient air quality environment ("TAQE(1)") and a plurality of additional transient air quality environments ("TAQE(n)");

determining, for the TRS(n), based on air quality data received from an IoT sensor located within the TAQE for each of the TRS(n) and while the IoT sensor is within direct wireless range of the user device, a plurality of transient air quality indexes ("TAQI(s)") including a first transient air quality index ("TAQI(1)") and a plurality of additional air quality indexes ("TAQI(n)");

determining, by the user device and while the user device travels across the TRS(n) to the DL, a plurality of second optimizations of the TRS(n) based on the DLAQI(1), the plurality of DLAQI(n), the TAQI(1), and the plurality of TAQI(n); and continually re-determining the plurality of second optimizations until the user device arrives at the DL.

2. The process of claim 1, wherein the CULAQI is further determined based on an air quality rating provided by a governmental entity.

3. The process of claim 1, further comprising:

receiving real-time air quality index data ("RAQI") for the CULAQE ("CUL-RAQI");

wherein the CULAQE varies with changes in weather; and performing a third optimization of the plurality of TRS(n) based on the CUL-RAQI.

4. The process of claim 3, further comprising:

obtaining, for the DL, while the user device transits along the plurality of TRS(n) from the CUL to the DL a destination location current air quality environment ("DLAQE(C)"); and obtaining, for the DLAQE(C), a destination location current air quality index ("DLAQI(C)").

5. The process of claim 4, further comprising:

receiving RAQI for the DLAQE(C); and wherein the first optimization is further based on the RAQI for the DLAQE(C).

6. The process of claim 4, further comprising:

wherein the second optimization is further based on the DLAQI(C).

7. The process of claim 4, further comprising:

performing the second optimization of at least one of the CRS and the TRS(n) is based on the DLAQI(C).

8. The process of claim 4, further comprising:

obtaining, for the DL, a destination location second air quality environment ("DLAQE(2)"); and obtaining, for the DLAQE(2), a destination location second air quality index ("DLAQI(2)").

9. The process of claim 8, further comprising:

rank ordering the DLAQI(1) and the DLAQI(2); and wherein the first optimization is further based on a higher ranked of the DLAQI(1) and the DLAQI(2).

10. The process of claim 9, further comprising:

determining the second optimization of at least one of the plurality of TRS(n) based on the plurality of TAQI(s).

11. The process of claim 10, further comprising:

receiving real-time air quality index data ("RAQI") for the TAQE(s); and wherein an optimization of the CRS is based on an RAQI for a TAQE in which the user device is currently located.

12. A non-transitory computer readable medium, non-transitorily storing first computer instructions which, when executed by at least one processor instantiates an enviro-engine which configures a user device to route a user from a current location to a destination by performing routing operations comprising:

determining, by the user device, a current user location ("CUL") of a user;

receiving, by the user device, for the CUL first digital mapping data identifying a current user location air quality environment ("CULAQE");

wherein a geographic area corresponding to the CULAQE varies over time with weather changes;

determining, by the user device, while the user device is located within the CULAQE, and based on air quality data received from at least one Internet-of-Things ("IoT") sensor within direct wireless range of the user device, a current user location air quality index ("CU-LAQI");

determining, by the user device, a destination location ("DL") for a destination;

determining, by the user device, a plurality of route segments ("RS"), including a current route segment ("CRS") and a plurality of transient route segment ("TRS(n)"), from the CUL to the DL;

determining, by the user device, a first optimization of the plurality of route segments based on the CULAQI and a destination location first air quality index ("DLAQI (1)");

determining, for the TRS (n), based on air quality data received from an IoT sensor located within a transient air quality environment ("TAQE") for each of the TRS(n) and while the IoT sensor is within direct wireless range of the user device, a plurality of transient air quality indexes ("TAQI(s)") including a first transient air quality index ("TAQI(1)") and a plurality of additional air quality indexes ("TAQI(n)");

determining, by the user device and while the user device travels across the TRS(n) to the DL, a plurality of second optimizations of the TRS(n) based on the DLAQI(1), a plurality of additional destination location air quality indexes ("DLAQI(n)"), the TAQI(1), and the plurality of TAQI(n); and continually re-determining the plurality of second optimizations while the user device travels from the CUL to the DL.

13. The non-transitory computer readable medium of claim 12, wherein the CULAQI-is further determined based on an air quality rating provided by a governmental entity.

14. The non-transitory computer readable medium of claim 12, wherein the DLAQI(1) is determined based on air quality data readings received from at least one Internet-of-Things ("IoT") sensors located within a destination location air quality environment ("DLAQE"); and wherein a geographic area for the DLAQE varies over time based upon weather changes.

15. The non-transitory computer readable medium of claim 12, wherein the routing operations further comprise:

obtaining, by the user device and for the DL, a destination location air quality environment ("DLAQE");

obtaining, by the user device and for the DLAQE, a destination location air quality index ("DLAQI");

receiving, by the user device, first real-time air quality index data ("1RAQI") for the DLAQE; and continually performing, by the user device, a third optimization of the plurality of route segments based on the 1RAQI;

wherein a geographic area for the DLAQE varies over time based upon weather changes within at least one portion of the geographic area.

16. The non-transitory computer readable medium of claim 15, wherein the routing operations further comprise:

receiving, by the user device, real-time air quality index data ("RAQI") for the CULAQE; and wherein the first optimization is further based on the RAQI for the CULAQE.

17. The non-transitory computer readable medium of claim 12, wherein the routing operations further comprise:

executing second computer instructions which instantiate a vehicle configuration engine which configures the user device to provide controlled air space within a vehicle during transit along at least a portion of the plurality of RS.

18. A user device comprising:

a processor;

a non-transitory data store storing non-transitory computer instructions; and a network interface;

wherein the processor, when executing the non-transitory computer instructions instantiates an enviroengine which configures the user device to route a user from a current location to a destination by performing routing operations comprising:

determining a current user location ("CUL") of a user;

obtaining, for the CUL, a current user location air quality environment ("CULAQE");

wherein a geographic area corresponding to the CULAQE varies over time with weather changes;

determining, for the CULAQE, a current user location air quality index ("CULAQI");

wherein the CULAQI is determined based on air quality data received from an Internet-of-Things ("IoT") sensor located within the CULAQE and within direct wireless range of the user device;

determining a destination location ("DL") for a destination;

determining a plurality of route segments ("RS"), including a current route segment ("CRS") and a transient route segment ("TRS") from the CUL to the DL;

performing a first optimization of the CRS based on the CULAQI;

obtaining, for the DL, a destination location air quality environment ("DLAQE");

obtaining, for the DLAQE, a plurality of destination location air quality indexes ("DLAQI(s)") including a first destination location air quality index ("DLAQI(1)") and a plurality of additional destination location air quality indexes ("DLAQI (n)");

wherein the DLAQI is determined based upon at least one past condition for the DLAQE;

receiving first real-time air quality index data ("RAQI") for the DLAQE;

performing a second optimization of the CRS based on the RAQI for the DLAQI(s);

identifying a plurality of transient air quality environments ("TAQE(s)") including a first transient air quality environment ("TAQE(1)") and at least one additional transient air quality environment ("TAQE(n)");

obtaining, over time and for the TAQE(s), a plurality of transient air quality indexes ("TAQI(s)") including a first transient air quality index ("TAQI(1)" and at least one additional transient air quality index ("TAQI(n)");

wherein the TAQI(s) are determined based on air quality data received from an IoT sensor located within the TAQE(s) and within direct wireless range of the user device at a given time while the user device travels from the CUL to the DL;

performing a third optimization of at least one of the CRS and the TRS (n) based on the TAQI(s);

receiving a second RAQI for the DLAQE; and performing a fourth optimization of at least one of TRS (n) based on the second RAQI.

*     *     *     *     *